(12) United States Patent
Wakiyama

(10) Patent No.: US 7,295,136 B2
(45) Date of Patent: Nov. 13, 2007

(54) COMMUNICATION SYSTEM

(75) Inventor: Kenichi Wakiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 11/065,284

(22) Filed: Feb. 25, 2005

(65) Prior Publication Data
US 2005/0190619 A1 Sep. 1, 2005

(30) Foreign Application Priority Data
Feb. 27, 2004 (JP) .............................. 2004-054251

(51) Int. Cl.
*G08G 1/123* (2006.01)
*G08B 29/00* (2006.01)
*G06F 11/30* (2006.01)

(52) U.S. Cl. .................. 340/995.27; 340/5.8; 340/506; 713/194

(58) Field of Classification Search ........... 340/995.27, 340/5.8, 5.86, 5.1, 425.5, 426.1, 505, 506, 340/568.1, 571; 702/165; 713/193–194; 701/32, 35
See application file for complete search history.

(56) References Cited

U.S. PATENT DOCUMENTS

| 5,924,057 | A  | * | 7/1999  | Kell .......................... 702/165 |
| 6,092,193 | A  | * | 7/2000  | Loomis et al. ............... 713/193 |
| 6,772,090 | B2 | * | 8/2004  | Hutton et al. ................ 702/165 |
| 6,961,671 | B2 | * | 11/2005 | Ko .............................. 702/168 |
| 6,980,923 | B1 | * | 12/2005 | Manakkal .................... 702/165 |

OTHER PUBLICATIONS

"Digital Meter" written and edited by new car electronics research; "New Car Electronics"; Apr. 20, 1992; pp. 117-122.

* cited by examiner

*Primary Examiner*—Toan N. Pham
(74) *Attorney, Agent, or Firm*—Posz Law Group, PLC

(57) ABSTRACT

In a communication system, a receiving module provided in a second electronic unit receives first information transmitted from a first electronic unit. A comparing module provided in the second electronic unit compares the received first information with second information previously stored in the second electric unit to determine whether data stored in the first electronic unit is tampered based on the compared result.

11 Claims, 10 Drawing Sheets

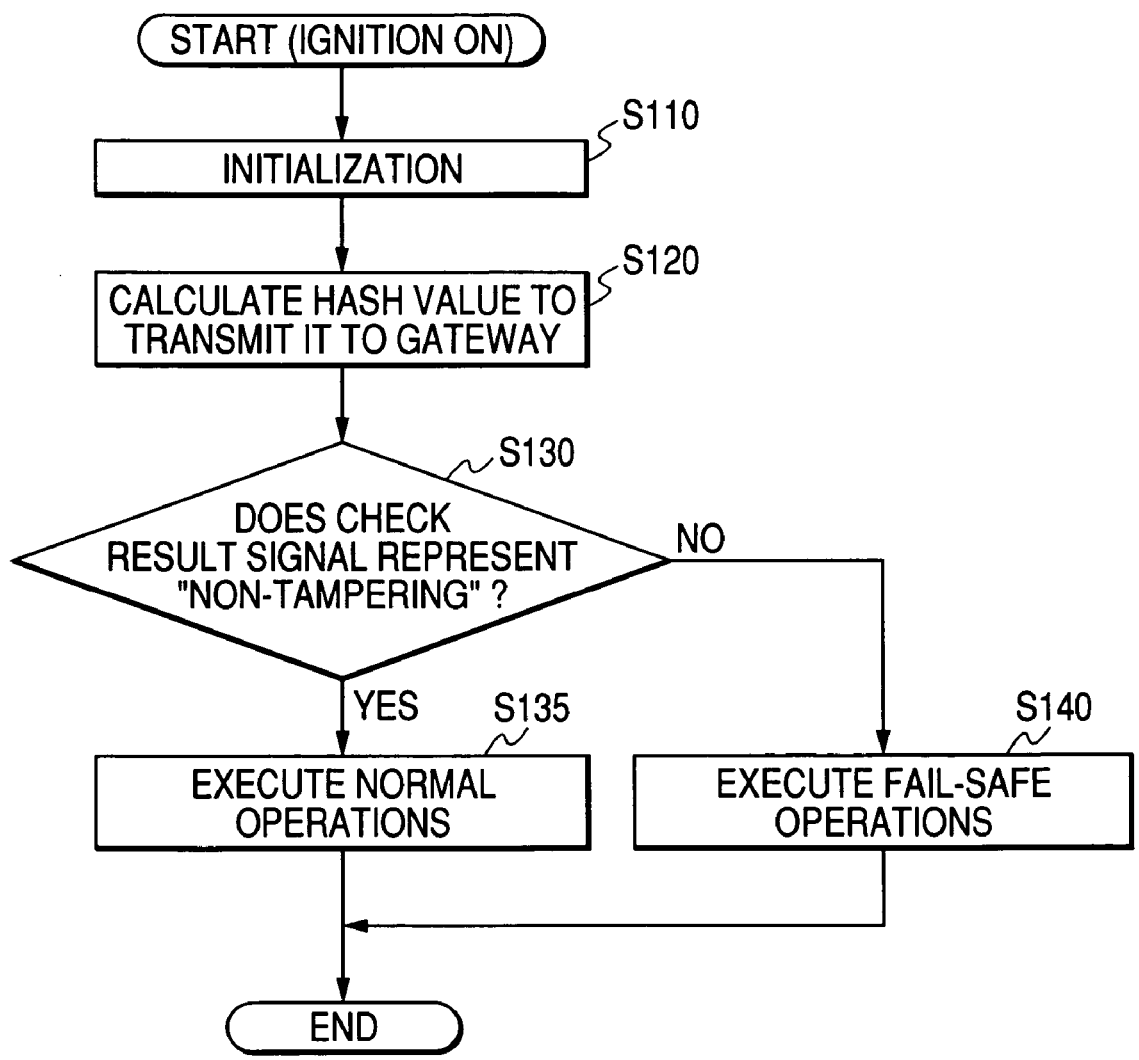

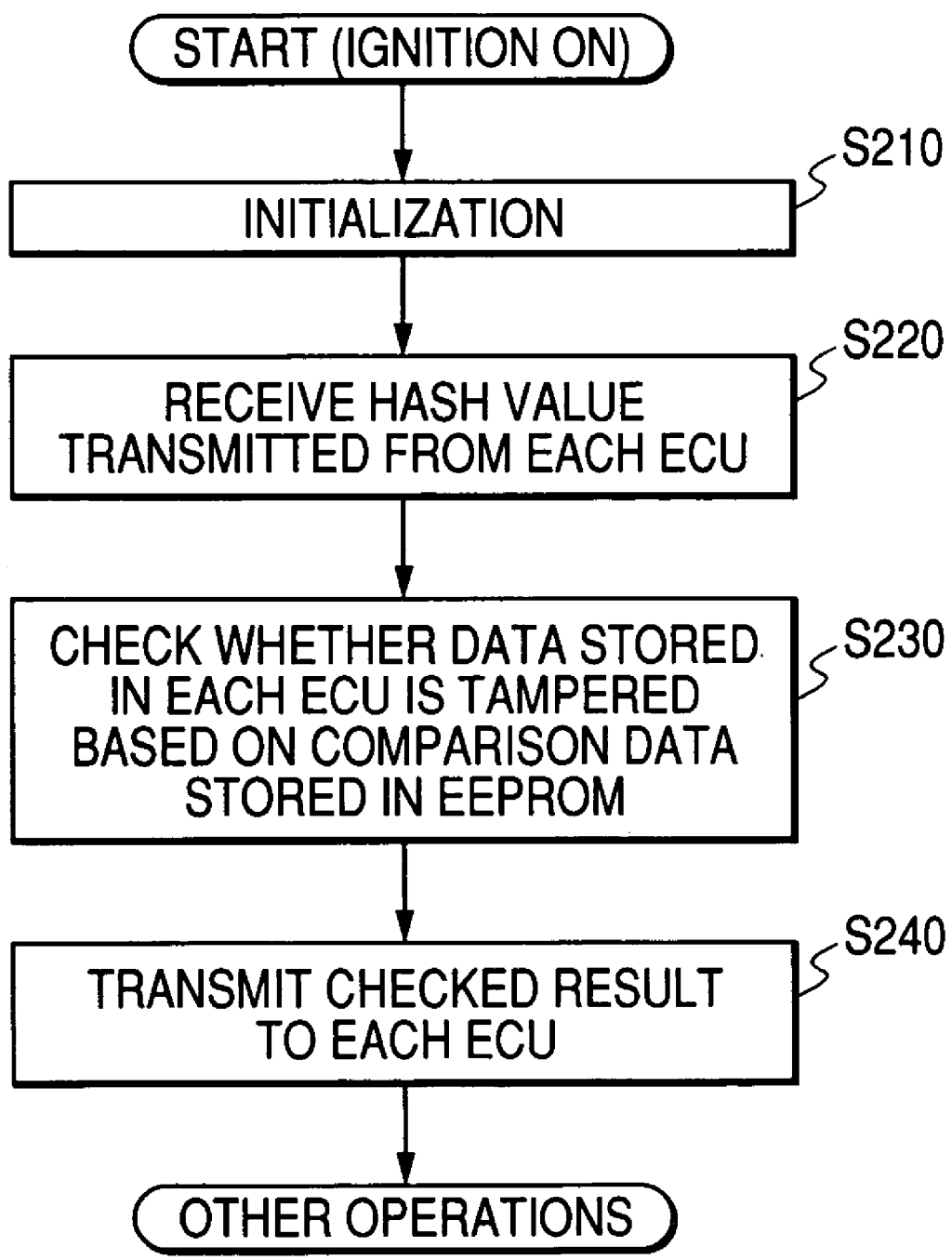

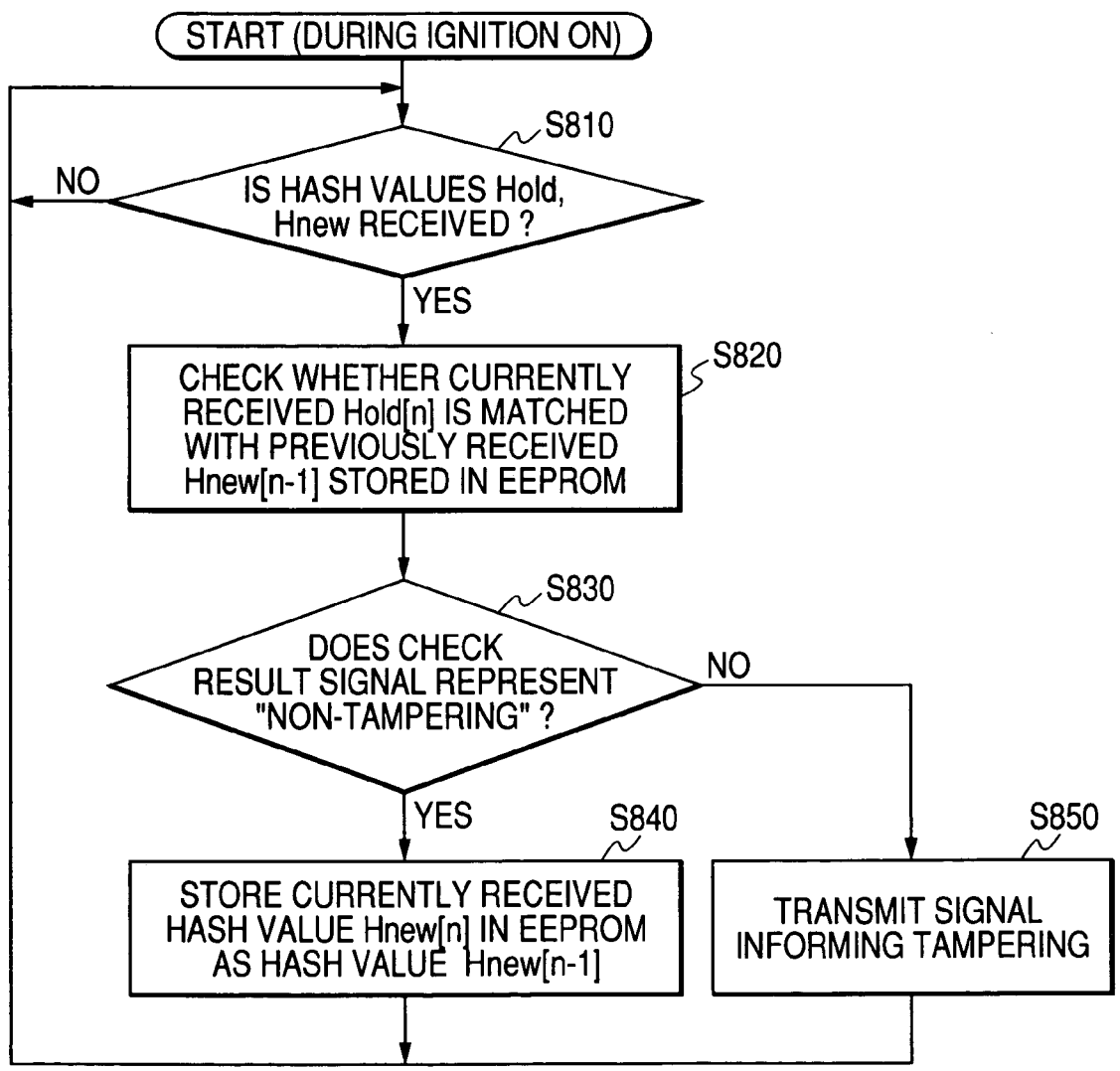

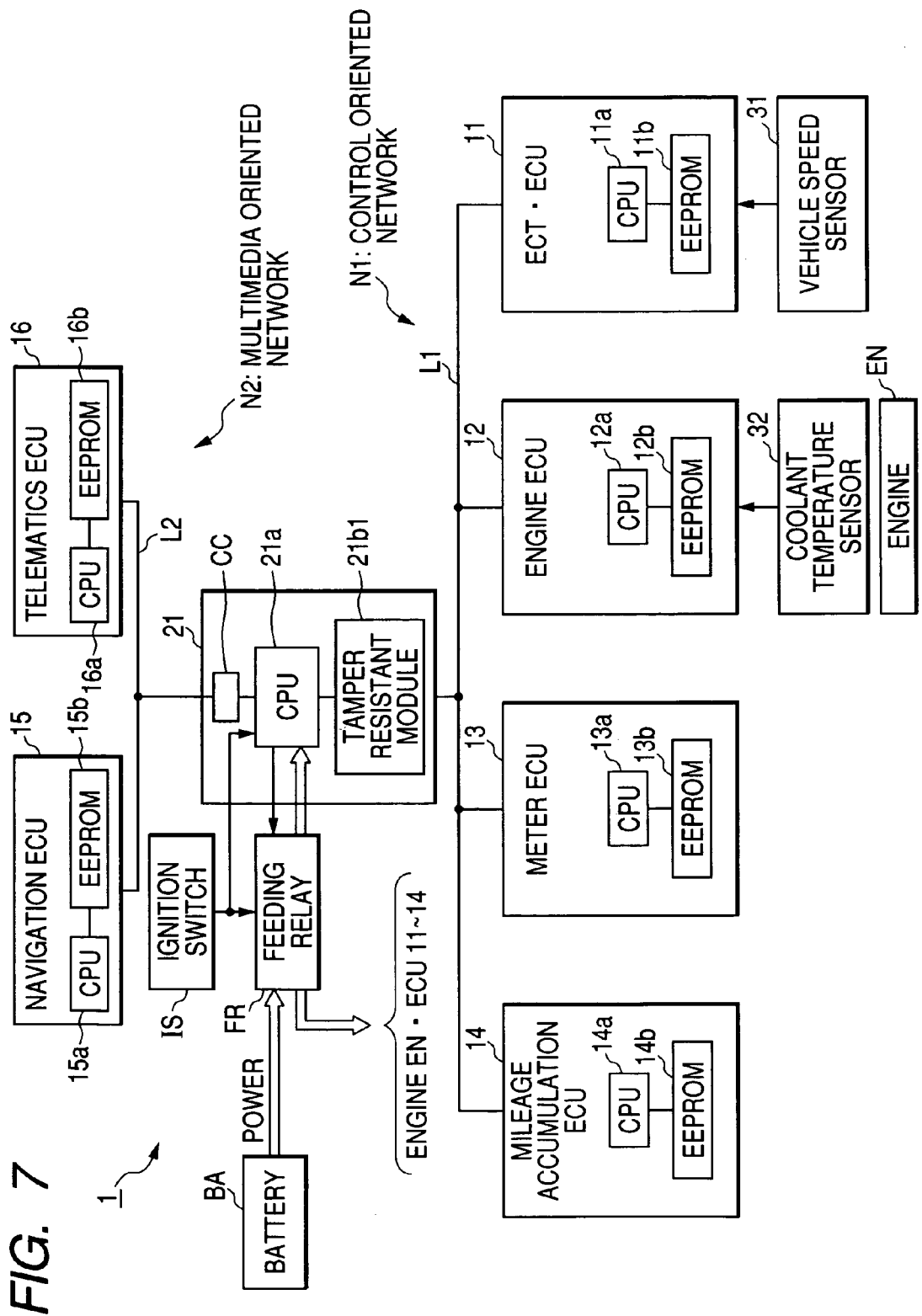

COMMUNICATION SYSTEM

CROSS REFERENCE TO RELATED APPLICATION

This application is based on Japanese Patent Application 2004-054251 filed on Feb. 27, 2004 and claims the benefit of priority therefrom, so that the descriptions of which are all incorporated herein by reference.

BACKGROUND OF THE INVENTION

Field of the Invention

The present invention relates to a communication system with a plurality of electronic units that are connected to a communication line.

For example, connecting a plurality of ECUs (electronic control units) to a communication line 100 in an automobile as shown in FIG. 8 establishes a communication system, in other words, in-vehicle LAN (Local Area Network) therein. The communication system allows the ECUs to communicate with each other through the communication line 100 so that they provide information therebetween and coordinately operate.

The communication system illustrated in FIG. 8 is provided with an ECT (Electronic Control Transmission) ECU 101 for controlling an automatic transmission, an engine ECU 102 for controlling an engine, a meter ECU 103 for display control of meters including an odometer, and a mileage accumulation ECU 104 for accumulating a mileage of the vehicle.

The mileage accumulation ECU 104 periodically receives the speed of the vehicle, in other words, data indicative of the speed thereof, sent from another ECU, such as the ECT ECU 101. The mileage accumulation ECU 104 accumulates mileage based on the received the vehicle's speed to obtain a total mileage of the vehicle, that is, data indicative of the total mileage of the vehicle. Specifically, the total mileage shows the accumulated mileage that the vehicle has traveled. The mileage accumulation ECU 104 feeds the accumulated mileage, that is, data indicative of the accumulated mileage of the vehicle to the meter ECU 103 so that the meter ECU 103 displays the accumulated mileage on the odometer.

The mileage accumulation ECU 104 updates the accumulated mileage stored in an EEPROM (Electrically Erasable programmable read only memory) 105, which is a type of nonvolatile memories, to hold the updated accumulated mileage when power is removed from the EEPROM 105, for example, when a battery in the vehicle is removed. A CPU 106 installed in the mileage accumulation ECU 104 runs a program to carry out the updating operations of the mileage accumulation ECU 104.

Restrictions are put on the number of rewrites in the nonvolatile memories, such EEPROMs, in which the entire contents can be rewritable. Due to the restrictions, the accumulated mileage is updated in the EEPROM every time the accumulated mileage increases by a predetermined mile corresponding to, for example, one-kilometer. This description is disclosed in the book "NEW CAR ELECTRONICS", pp117-122, written and edited by new car electronics research, under the editorship of SYUJI MIZUTANI, launched by SANKAIDO PUBLISHING CO., LTD.

If illegally replacing the EEPROM 105 in the mileage accumulation ECU 104 of the vehicle with new one, the accumulated mileage (total mileage) displayed on the odometer may be tampered with. That is, replacement of the EEPROM 105 with new one may cause the accumulated mileage stored in the mileage accumulation ECU 104 to be altered. This tampering may cause the worse of the vehicle to be illegally changed.

On the other hand, various kinds of security functions have been installed in ECUs in recent years. If tampering programs installed in the ECUs, not particular to the accumulated mileage, the security functions installed in the ECUs may become invalid.

SUMMARY OF THE INVENTION

The present invention is made on the background so that preferable embodiments of the present invention are designed to detect that at least one of program and data in an electronic unit is tampered with.

According to one aspect of the present invention, there is provided a communication system with first and second electronic units communicably coupled to each other, the first electronic unit storing data. The communication system includes a first transmitting module provided in the first electronic unit and configured to transmit to the second electronic unit first information indicative of a feature of the data stored in the first electronic unit, a storing module provided in the second electronic unit and configured to previously store second information corresponding to the first information, a receiving module provided in the second electronic unit and configured to receive the first information transmitted from the first electronic unit, and a comparing module provided in the second electronic unit and configured to compare the received first information with the second information to determine whether the data stored in the first electronic unit is tampered based on the compared result.

According to another aspect of the present invention, there is provided a communication system installed in a vehicle and having first and second electronic control units communicably coupled to each other for controlling devices installed in the vehicle, the first electronic unit storing data. The communication system includes a first transmitting module provided in the first electronic control unit and configured to transmit to the second electronic control unit first information indicative of a feature of the data stored in the first electronic control unit, a storing module provided in the second electronic control unit and configured to previously store second information corresponding to the first information, a receiving module provided in the second electronic control unit and configured to receive the first information transmitted from the first electronic control unit, and a comparing module provided in the second electronic control unit and configured to compare the received first information with the second information to determine whether the data stored in the first electronic control unit is tampered based on the compared result.

BRIEF DESCRIPTION OF THE DRAWINGS

Other objects and aspects of the invention will become apparent from the following description of embodiments with reference to the accompanying drawings in which:

FIG. 2A is a flowchart schematically illustrating operations executed by each ECU in a control-oriented network of the communication system shown in FIG. 1 according to the first embodiment;

FIG. 2B is a flowchart schematically illustrating operations executed by a gateway of the communication system shown in FIG. 1 according to the first embodiment;

FIG. 5B is a flowchart schematically illustrating operations executed by the gateway according to the third embodiment;

FIG. 7 is a block diagram illustrating a configuration of a communication system according to a modification of each embodiment of the present invention.

DETAILED DESCRIPTION OF EMBODIMENTS OF THE INVENTION

Communication systems of embodiments each to which the present invention is applied will be described hereinafter with reference to the accompanying drawings. Each communication system in each embodiment constitutes an in-vehicle LAN with a plurality of ECUs as nodes.

First Embodiment

Figure 1:
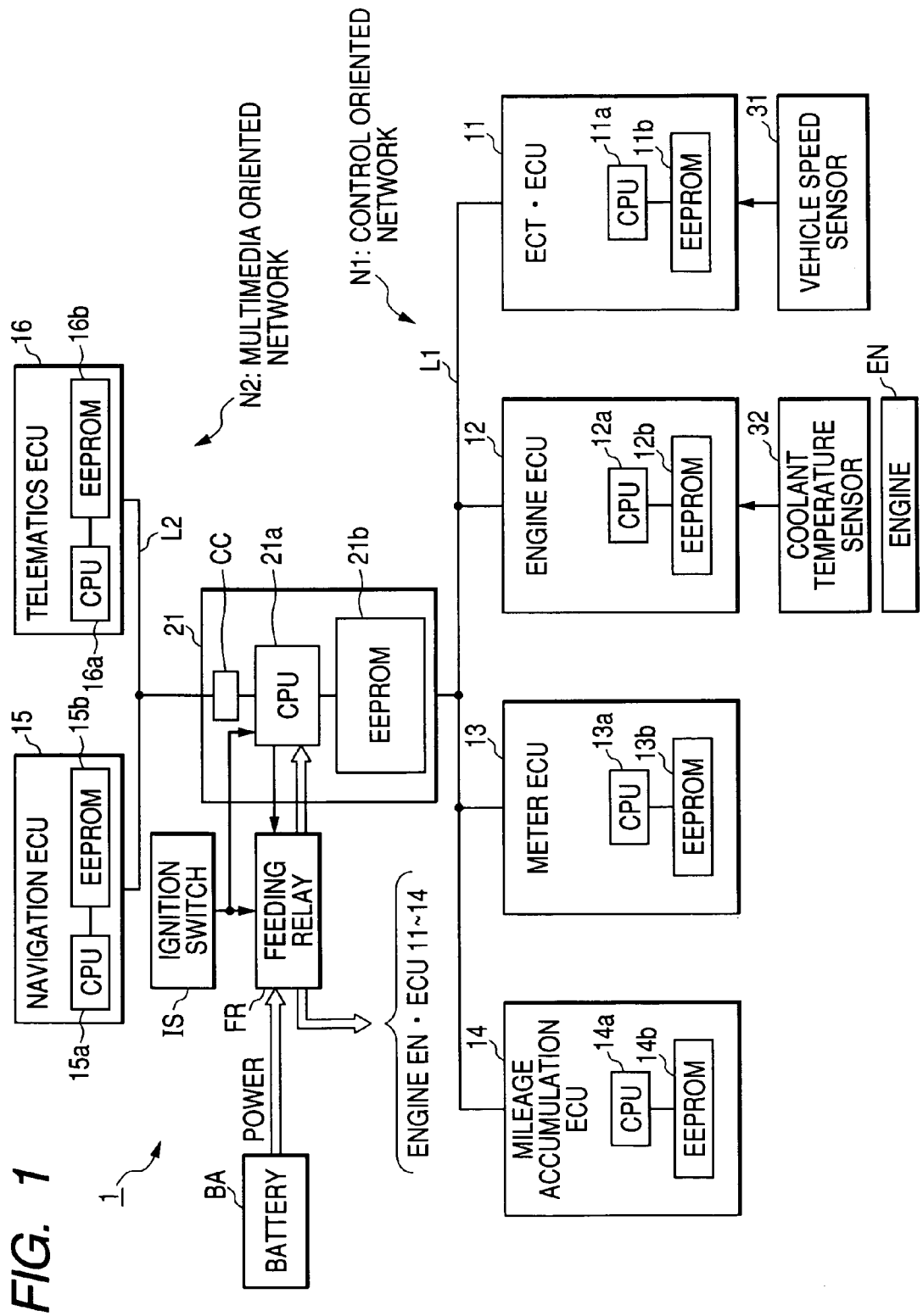
FIG. 1 is a block diagram illustrating a configuration of a communication system according to a first embodiment of the present invention.

FIG. 1 is a block diagram illustrating a configuration of a communication system 1 according to a first embodiment of the present invention.

The communication system 1 according to the first embodiment is installed in a vehicle. The communication system 1 is provided with a control-oriented network N1. The control-oriented network N1 includes an ECT ECU 11 for controlling an automatic transmission in the vehicle. The control-oriented network N1 includes an engine ECU 12 for controlling an engine EN in the vehicle. The control-oriented network N1 includes a meter ECU 13 for display control of meters including an odometer, a vehicle speed meter, and a coolant temperature meter.

The control-oriented network N1 includes a mileage accumulation ECU 14 for accumulating a mileage of the vehicle. The control-oriented network N1 includes a communication line L1 to which the ECT ECU 11, the engine ECU 12, the meter ECU 13, and the mileage accumulation ECU 14 are connected, respectively, so that they are communicable with each other through the communication line L1.

The communication system 1 according to the first embodiment is installed in a vehicle. The communication system 1 is provided with a multimedia-oriented network N2. The multimedia oriented network N2 includes a navigation ECU 15 for controlling navigation devices installed in the vehicle. The multimedia network N2 includes a telematics ECU 16 for communicating with radio communication devices installed in an information center disposed to the exterior of the vehicle. The multimedia-oriented network N2 includes a communication line L2 to which the navigation ECU 15 and the telematics ECU 16 are connected, respectively, so that they are communicable with each other through the communication line L2.

The communication system 1 is provided with a gateway (GW) 21 connected to both the communication lines L1 and L2. The ECUs 11 to 14 in the control-oriented network N1 and the ECUs 15 and 16 in the multimedia-oriented network N2 are communicable with one another through the gateway 21.

The ECUs 11 to 16 have microcomputer 11a to 16a, respectively. Each of the microcomputers 11a to 16a is programmed to execute various processes related to each of the corresponding ECUs 11 to 16. Each of the microcomputers 11a to 16a includes a CPU (Central Processing Unit), a ROM (Read Only Memory) in which programs to be executed by the CPU are stored, and a RAM (Random Access Memory) that allows the CPU to temporarily store data therein. The microcomputers 11a to 16a are referred to as CPUs, hereinafter.

The ECUs 11 to 16 have EEPROMs 11b to 16b as nonvolatile memories, which are connected to the CPUs 11a to 16a, respectively. Each of the EEPROMs 11b to 16b can continuously hold at least a portion (block) of data computed by each of the CPUs 11a to 16a. The at least portion of computed data is stored in each of the EEPROMs 11b to 16b in file format. At least a portion (block) of at least one program to be executed by each of the CPUs 11a to 16a is stored in each of the EEPROMs 11b to 16b in file format, and at least a portion (block) of constant data is stored in each of the EEPROMs 11b to 16b in file format. As a result, the data files are stored in each of the EEPROMs 11b to 16b.

The microcomputer 21a is programmed to execute various processes related to the gateway 21. The microcomputer 21a includes a CPU, a ROM in which programs to be executed by the CPU are stored, and a RAM that allows the CPU to temporarily store data therein. The microcomputer 21a is referred to as CPU, hereinafter. The gateway 21 has an EEPROM 21b, which is similar to each of the ECUs 11 to 16. The gateway 21 also has a communication circuit CC connected to the CPU 21a and to the communication line L2 of the multimedia-oriented network N2.

In the communication system 1, for example, the ECT ECU 11 (the CPU 11a) periodically detects a speed of the vehicle based on a signal corresponding to the speed of the vehicle and periodically sent from a vehicle speed sensor 31 installed in the vehicle. The ECT ECU 11 uses the detected speeds of the vehicle to control the automatic transmission, and periodically sends the detected speed of the vehicle to the communication line L1.

In the communication system 1, for example, the engine ECU 12 (the CPU 12a) periodically detects a temperature of a cooling water for the engine based on a signal corresponding to the temperature of the cooling water and periodically sent from a coolant temperature sensor 32 installed in the vehicle. The engine ECU 12 uses the detected temperatures of the cooling water to control the engine, and periodically sends the detected temperature of the cooling water to the communication line L1.

In the communication system 1, for example, the mileage accumulation ECU 14 (the CPU 14a) periodically receives the speed of the vehicle periodically sent from the ECT ECU 11 through the communication line L1 to accumulate mileage based on the received speeds of the vehicle, thereby obtaining a total mileage of the vehicle. Specifically, the total mileage shows the accumulated mileage that the vehicle has traveled.

The mileage accumulation ECU 14 periodically sends the accumulated mileage to the communication line L1. The mileage accumulation ECU 14 periodically updates the accumulated mileage in the EEPROM 14b so that the accumulated mileage of the vehicle is continuously held in the EEPROM 14b.

In the communication system 1, for example, the meter ECU 13 periodically receives the accumulated mileage of the vehicle periodically sent from the mileage accumulation ECU 14 through the communication line L1 to display the received accumulated mileage on the odometer while periodically updating it. In addition, the meter ECU 13 periodically receives the speed of the vehicle periodically sent from the ECT ECU 11 through the communication line L1 to display the received speed of the vehicle on the vehicle speed meter while periodically updating it. Furthermore, the meter ECU 13 periodically receives the temperature of the cooling water periodically sent from the engine ECU 12 to display the received temperature of the cooling water on the coolant temperature meter.

In the communication system 1, when an ignition switch IS installed in the vehicle is turned on, power is supplied from a battery BA to the engine EN. In the communication system 1, each of the ECUs 11 to 14 in the control-oriented network N1 and the gateway 21 is configured to initiate operations from its initial state when the ignition switch IS is turned on so that power feeding from the battery BA to each of the ECUs 11 to 14 and the gateway 21 is started.

When the ignition switch IS is turned off, the power is shut down to the engine EN. In the communication system 1, when the ignition switch IS is turned off, each of the ECUs 11 to 14 and the gateway 21 is configured to execute termination processing. After the termination processing is completed, the power feeding is shut down to each of the ECUs 11 to 14 and the gateway 21 so that each of the ECUs 11 to 14 and the gateway 21 terminates the operations.

The start-up and termination of each of the ECUs 11 to 14 and the gateway 21 are implemented in the following structure and operations.

Specifically, each of the ECUs 11 to 14 and the gateway 21 is connected through a feeding relay FR to the battery BR. Specifically, at least one of the ECUs 11 to 14 and the gateway 21, for example, the gateway 21 in the first embodiment is electrically connected to the feeding relay FR, allowing turning-on and turning-off of the feeding relay FR.

When the ignition switch IS is turned on, the feeding relay FR is turned on so that power is fed from the battery BA to each of the ECU 11 to 14 and the gateway 21, which causes each of the ECUs 11 to 14 and the gateway 21 to start to operate.

To the gateway 21, an ignition switch signal indicative of whether the ignition switch is on-state or off-state is supplied from the ignition switch IS. When each of the ECUs 11 to 14 and the gateway 21 starts to operate based on the power, the gateway 21 keeps the feeding relay FR on based on the ignition switch signal.

When the ignition switch IS is turned off, the gateway 21 detects the turning-off of the ignition switch IS based on the ignition switch signal. In response to the detection of the turning-off of the ignition switch IS, the gateway 21 sends to the communication line L1 switch information representing that the ignition switch IS is turned off to inform the turning-off of the ignition switch IS to each of the ECU 11 to 14. In response to the turning-off of the ignition switch IS, the gateway 21 executes the termination processing.

When detecting the turning-off of the ignition switch IS based on the switch information, each of the ECUs 11 to 14 executes its terminating processing. After the terminating processing is completed, each of the ECUs 11 to 14 sends to the gateway 21 processing completion information indicative of the completion of the termination processing through the communication line L1.

When detecting the processing completion information sent from each of the ECUs 11 to 14 and the completion of the termination processing itself, the gateway 21 turns the feeding relay FR off, causing the power feeding to each of the ECUs 11 to 14 and the gateway 21 to be shut off.

On the other hand, each of the ECUs 15 and 16 in the multimedia-oriented network N2 is electrically connected through an accessory power line to the battery BA so that power is fed to each of the ECUs 15 and 16 through the accessory power line from the battery BA. The accessory power line is a power line that allows connection to the battery BA when a vehicle's key inserted in a key cylinder of the vehicle is in the "accessory position" or the "ignition position".

At the shutdown of the gateway 21, in other words, at the shutdown of the control-oriented network N1, the output of the communication circuit CC in the gateway 21 is in high impedance, which has little influence on the communication line L2.

Specifically, in the communication system 1, each of the ECUs 11 to 14 and the gateway 21 executes the following operations illustrated in FIGS. 2 and 3 to detect whether the programs and data stored in the ECUs 11 to 14 are tampered with.

Each of the CPUs 11a to 14a and 21a actually executes each of the programs stored in each of the ROMs to carry out the operations for detecting whether the programs and data are tampered with. In the first embodiment, all the data stored in each of the EEPROM 11b to 14b are subjected to the tampering detection, but part of the data stored in each of the EEPROM 11b to 14b can be subjected to the tampering detection.

The operations for detecting whether the programs and data are tampered with will be described hereinafter.

When the ignition switch IS is turned on so that each of the ECUs 11 to 14 starts to operate, each of the CPUs 11a to 14a executes the operations illustrated in FIG. 2A.

That is, each of the CPUs 11a to 14a executes initialization for initializing each of the RAMs and the like in step S110.

Next, in step S120, each of the CPUs 11a to 14a uses a one-way function, such as a hash function, to calculate a hash value from each of the data files stored in each of the EEPROM 11b to 14b.

Specifically, for example, the CPU 11a determines the hash function for each data file corresponding to the computed data, constant data, and the at least one program stored in the EEPROM 11b to pass it as an argument to the determined hash function to obtain a hash value corresponding to each data file stored in the EEPROM 11b. Similarly, each of the CPUs 12a to 14a executes the operations as the CPU 11a to obtain a hash value corresponding to each of the data files stored in each of the EEPROMs 12b to 14b.

Incidentally, a one-way function is a function whose inverse is very difficult to calculate. A function f is a one-way function if, given x, it is relatively easy to calculate y=f(x), but it is difficult to calculate the inverse function (that is, calculate the value of x if given the value of y).

In step S120, each of the CPUs 11a to 14a transmits to the gateway 21 the calculated hash values as feature information indicative of features of the data files stored in each of the EEPROM 11b to 14b through the communication line L1.

In step S130, each of the CPUs 11a to 14a receives a check result signal transmitted by the operations of the gateway 21 illustrated in FIG. 2B described hereinafter. Each of the CPUs 11a to 14a determines whether the check result signal represents "non-tampering".

When determining that the check result signal represents the "non-tampering", that is, the determination in step S130 is YES, each of the CPUs 11a to 14a executes normal operations based on the data files stored in each of the EEPROMs 11b to 14b. The normal operations of each of the CPUs 11a to 14a are specific operations thereto.

Fr example, the CPU 11a of the ECT ECU 11 executes the normal operations to control the automatic transmission based on the data files stored in the EEPROM 11b.

The CPU 12a of the engine ECU 12 executes the normal operations to control the engine EN based on the data files stored in the EEPROM 12b. Moreover, the CPU 13a of the meter ECU 13 executes the normal operations to carry out the display control of the meters based on the data files stored in the EEPROM 13b. The CPU 14a of the mileage accumulation ECU 14 executes the normal operations to calculate the accumulated mileage indicative of the total mileage of the vehicle based on the data files stored in the EEPROM 14b.

When determining that the check result signal represents "tampering", that is, the determination in step S130 is NO, each of the CPUs 11a to 14a shifts to step S140 to execute predetermined fail-safe operations. For example, as the predetermined fail-safe operations, each of the CPUs 11a to 14a executes the normal operations based on predetermined default data.

On the other hand, when the ignition switch IS is turned on so that the gateway 21 starts to operate, the CPU 21a executes the operations illustrated in FIG. 2B.

That is, the CPU 21a executes initialization for initializing each of the RAMs and the like in step S210.

Next, in step S220, the CPU 21a receives the hash values transmitted by the operation in step S120 of each of the CPUs 11a to 14a.

In step S230, the CPU 21a checks whether the data files stored in the EEPROM 11b are tampered with based on the hash values transmitted from the CPU 11a and tampering/non-tampering evaluation criteria information previously stored in the EEPROM 21b. The tampering/non-tampering evaluation criteria information is referred to as comparison data. Similarly, the CPU 21a checks whether the data files stored in each of the EEPROMs 12b to 14b are tampered with based on the hash values transmitted from each of the CPUs 12a to 14a and the comparison data previously stored in the EEPROM 21b.

In the first embodiment, hash values of data files that should be stored in the EEPROM 11b when the ECU 11 starts to operate in response to the turning-on of the ignition switch IS are stored, as the comparison data for the ECU 11, in the EEPROM 21b of the gateway 21.

Similarly, hash values of data files that should be stored in each of the EEPROMs 12b to 14b when each of the ECUs 12 to 14 starts to operate in response to the turning-on of the ignition switch IS are stored, as the comparison data for each of the ECUs 12 to 14, in the EEPROM 21b of the gateway 21. These comparison data storing operations will be illustrated in FIGS. 3A and 3B hereinafter.

Specifically, in step S230, the CPU 21a of the gateway 21, therefore, compares the received hash values transmitted from the ECU 11 with the corresponding hash values for the ECU 11 stored in the EEPROM 21b for each file.

Similarly, in step S230, the CPU 21a of the gateway 21 compares the received hash values transmitted from each of the ECUs 12 to 14 with the corresponding hash values for each of the ECUs 12 to 14 stored in the EEPROM 21b for each file.

When all of the hash values transmitted from each of the ECUs 11 to 14 are consistent with all of the corresponding hash values for each of the ECUs 11 to 14 stored in the EEPROM 21b, the CPU 21a determines that the data files stored in each of the EEPROMs 11b to 14b of the ECUs 11 to 14 have not been tampered with, in other words, "non-tampering".

In contrast, when at least one of the hash values transmitted from at least one of the ECUs 11 to 14 is inconsistent with a corresponding one for at least one of the ECUs 11 to 14 stored in the EEPROM 21b, the CPU 21a determines that at least one of the data files stored in at least one of the EEPROMs 11b to 14b of the ECUs 11 to 14 has been tampered with, in other words, "tampering".

In step S240, the CPU 21a transmits the check result signal indicative of whether each of the ECUs 11 to 14 is tampered with (tampering) or not (non-tampering) to each of the ECUs 11 to 14, shifting to other operations.

Figure 3A:
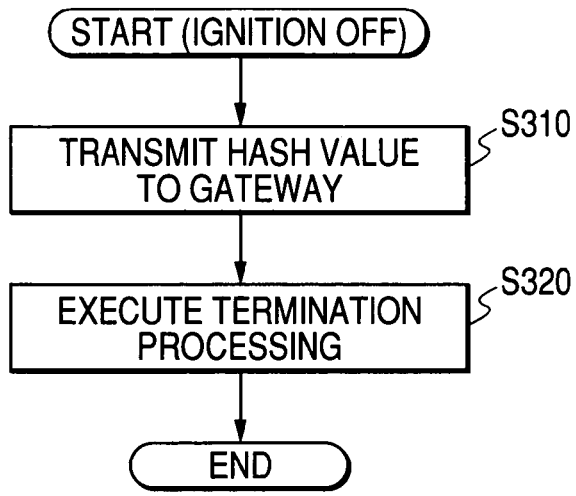
FIG. 3A is a flowchart schematically illustrating operations executed by each ECU in the control-oriented network of the communication system shown in FIG. 1 according to the first embodiment.

Next, when detecting the turning-off of the ignition switch IS, each of the CPUs 11a to 14a of the ECUs 11 to 14 executes the operations illustrated in FIG. 3A.

That is, in step S310, each of the CPUs 11a to 14a uses the hash function, which is the same as that used in step S120, to calculate a hash value from each of the data files stored in each of the EEPROM 11b to 14b.

Specifically, in step S310, as with the operations in step S120, the CPU 11a determines the hash function for each data file stored in the EEPROM 11b to pass it as an argument to the determined hash function to obtain a hash value corresponding to each data file stored in the EEPROM 1b. Similarly, each of the CPUs 12a to 14a executes the operations as the CPU 11a to obtain a hash value corresponding to each of the data files stored in each of the EEPROMs 12b to 14b.

In step S310, each of the CPUs 11a to 14a transmits to the gateway 21 the calculated hash values as feature information indicative of features of the data files stored in each of the EEPROM 11b to 14b through the communication line L1.

Subsequently, in step 8320, each of the CPUs 11a to 14a executes terminating processing. After the terminating processing is completed, each of the ECUs 11 to 14 sends to the gateway 21 the processing completion information through the communication line L1. As set forth above, when detecting the processing completion information sent from each of the ECUs 11 to 14 and the completion of the termination processing itself, the gateway 21 turns the feeding relay FR off, causing the power feeding to each of the ECUs 11 to 14 to be shut off.

Figure 3B:
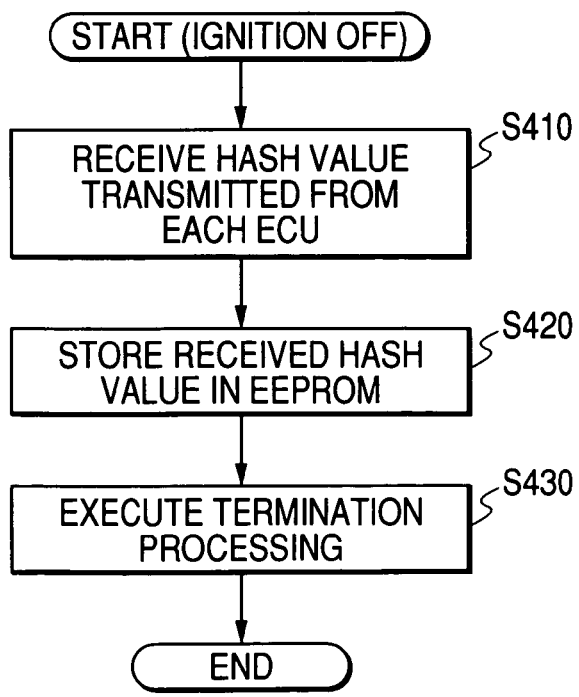
FIG. 3B is a flowchart schematically illustrating operations executed by the gateway according to the first embodiment.

On the other hand, when determining the turning-off of the ignition switch IS, the CPU 21a of the gateway 21 executes the operations illustrated in FIG. 3B.

Specifically, in step S410, the CPU 21 receives the hash values transmitted by the operation in step S310 of each of the CPUs 11a to 14a.

In step S420, the CPU 21a stores the received hash values transmitted from the ECU 11 in the EEPROM 21b as the comparison data for the ECU 11. Similarly, the CPU 21a stores the received hash values transmitted from the ECU 12 in the EEPROM 21b as the comparison data for the ECU 12, and stores the received hash values transmitted from the ECU 13 in the EEPROM 21b as the comparison data for the ECU 13. Furthermore, the CPU 21a stores the received hash values transmitted from the ECU 14 in the EEPROM 21b as the comparison data for the ECU 14.

Subsequently, in step S430, the CPU 21a executes the termination processing. After that, when detecting the processing completion information sent from each of the ECUs 11 to 14, the gateway 21 turns the feeding relay FR off, causing the power feeding to each of the ECUs 11 to 14 and the gateway 21 to be shut off.

As described above, in the communication system 1 of the first embodiment, each of the ECUs 11 to 14 transmits to the gateway 21 the hash values indicative of the feature information representing features of the data files stored in each of the EEPROM 11b to 14b through the communication line L1 (see step S310 in FIG. 3A). The gateway 21 stores the hash values transmitted from each of the ECUs 11 to 14 in the EEPROM 21b as the comparison data for each of the ECUs 11 to 14 (see steps S410 and 420 in FIG. 3B).

When the ignition switch IS is turned on so that each of the ECUs 111 to 14 starts to operate, each of the CPUs 11a to 14a transmits to the gateway 21 the calculated hash values indicative of the feature information representing the features of the data files stored in each of the EEPROM 11b to 14b (see step S120). The gateway 21 compares the received hash values transmitted from each of the ECUs 11 to 14 with the corresponding hash values stored as the comparison data for each of the ECUs 11 to 14 in the EEPROM 21b for each file.

When at least one of the hash values transmitted from at least one of the ECUs 11 to 14 is inconsistent with a corresponding one for at least one of the ECUs 11 to 14 stored in the EEPROM 21b, the CPU 21a determines that at least one of the data files stored in at least one of the EEPROMs 11b to 14b has been tampered with, in other words, "tampering" (see steps S220 and 230).

According to the communication system 1 of the first embodiment, even if at least one of the data files corresponds to not only the at least one program and the constant data but also the computed data that varies during the operations of each ECU, it is possible to accurately detect that the at least one of the data files is tampered with. This is because, even if the data files stored in each of the EEPROMs 11b to 14b have any forms, when they are tampered with during the shutdown of each of the ECUs 11 to 14, it is possible for the gateway 21 to surely detect the tampering of the data files when each of the ECUs 11 to 14 starts to operate.

Even if at least one of the EEPROMs 11b to 14b, for example, 14b, is illegally replaced with new one so that a total mileage displayed on the odometer by the meter ECU 13 is tampered with to be shorter than the true total mileage, it is possible to certainly detect such an occurrence of tampering.

Incidentally, when the CPU 21a of the gateway 21 executes the operations shown in FIG. 2B without executing the operations shown in FIG. 3B, in other words, the ignition switch IS is turned on for the first time after the completion of the vehicle, no comparison data is stored in the EEPROM 21b. In this case only, the CPU 21a of the gateway 21 skips the tampering check operation shown in step S230 to step S240, and transmits the check result signal representing that each of the ECUs 11 to 14 is not tampered with (non-tampering) to each of the ECUs 11 to 14 without conditions in step S240.

Hash values calculated based on default values, which are stored in each of the EEPROM 11b to 14b, of the computed data, the constant data, and the at least one program during the manufacture of the vehicle can be stored in the EEPROM 21b of the gateway 21 as default values of the comparison data.

This modification allows the gateway 21 to have executed the tampering check operations from the time the ignition switch IS is turned on first.

In the first embodiment, the feature information transmitted by the operation of each of the ECUs 11 to 14 in step S120 and step S310 to the gateway 21 is not limited to the hash values. Specifically, after the operation in step S110 or step S310, the data files stored in each of the EEPROM 11b to 14b, which are the target for checking tampering, can be transmitted from each of the ECUs 11 to 14 to the gateway 21. As compared with the modification, the structure of the first embodiment has advantages in that the amount of data to be transmitted between each ECU and the gateway 21 is small, and the amount of available memory in the EEPROM 21b is sufficiently ensured because the hash values are smaller than the data files in size.

Other types of one-way functions can be used in place of the hash function to calculate the feature information indicative of the features of the data files stored in each of the EEPROM 11b to 14b.

The gateway 21 can constantly operate. The gateway 21 can operate based on power supplied from the accessory power line, which is similar to each of the ECUs 15 and 16 in the multimedia-oriented network N2 as long as each of the ECUs 11 to 14 certainly receives the feature information transmitted by the operation of each of the ECUs 11 to 14 to store it therein in step S310.

Incidentally, in the first embodiment, each of the ECUs 11 to 14 represents, for example, a first electronic unit of the present invention, and the gateway 21 represents, for example, a second electronic unit thereof. Moreover, the operation of each of the ECUs 11 to 14 in step S220 represents, for example, a first transmitting module of the present invention, and the EEPROM 21b of the gateway 21 represents, for example, a storing module of the present invention. The operation of the gateway 21 in step S220 represents, for example, a receiving module of the present invention, and the operation of the gateway 21 in step S230 represents, for example, a comparing module of the present invention.

In the first embodiment, the operation of each of the ECUs 11 to 14 in step S310 represents, for example, a second transmitting module of the present invention.

Second Embodiment

Next, a communication system according to a second embodiment of the present invention will be described hereinafter. The communication system according to the second embodiment has substantially the same structure as the first embodiment so that the elements in the communication system of the second embodiment, which are the same as those in the first embodiment, are assigned to the same reference numerals of the elements shown in FIG. 1.

Figure 4A:
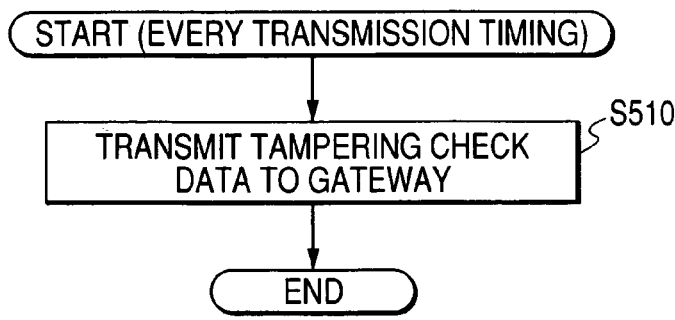
FIG. 4A is a flowchart schematically illustrating operations executed by each ECU in the control-oriented network according to a second embodiment of the invention.

In the communication system 1A of the second embodiment, as compared with the communication system 1, each of the CPUs 11a to 14a of each of the ECUs 11 to 14 executes operations shown in FIG. 4A in addition to the operations shown in FIGS. 2A and 3A. In addition, the CPU 21a of the gateway 21 executes operations shown in FIG. 4B in addition to the operations shown in FIGS. 2B and 38. Each of the CPUs 11a to 14a and 21a executes each of the programs stored in each of the ROMs to carry out the operations shown in FIGS. 4A and 4B.

Specifically, during the turning-on of the ignition switch IS, every time a transmission timing is transmitted at regular intervals each of the CPUs 11a to 14a executes the operations shown in FIG. 4A.

In step S510, each of the CPUs 11a to 14a extracts at least one data file corresponding to at least one item of the computed data from the data files stored in each of the EEPROMs 11b to 14b. The at least one data item of the computed data has been updated with a predetermined change tendency during the normal operations of each of the ECUs 11 to 14. Each of the CPUs 11a to 14a transmits to the gateway 21 the at least one data file (the at least one data item) as data that should be checked for tampering during the normal operations of each of the ECUs 11 to 14. The data that should be checked for tampering during the normal operations of each of the ECUs 11 to 14 is referred to as tampering check data. After the transmission, each of the CPUs 11a to 14a terminates the operations. For example, the mileage accumulation ECU 14 transmits the accumulated mileage stored in the EEPROM 14b to the gateway 21 as the tampering check data in step S510.

Figure 4B:
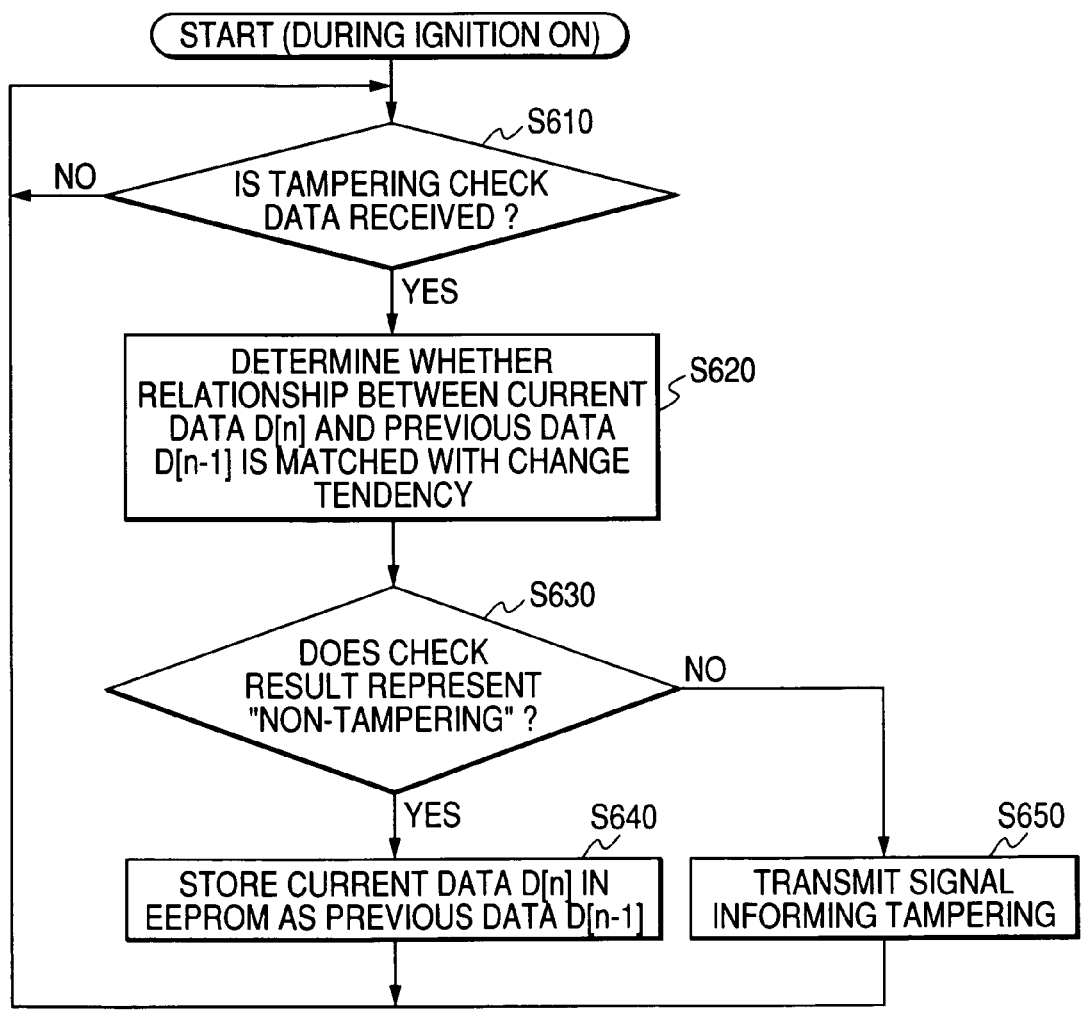
FIG. 4B is a flowchart schematically illustrating operations executed by the gateway according to the second embodiment.

On the other hand, the CPU 21a of the gateway 21 executes the operations shown in FIG. 4B during the turning-on of the ignition switch IS.

Specifically, in step S610, the CPU 21a of the gateway 21 determines whether the tampering check data transmitted from each of the ECUs 11 to 14 is received by the CPU 21a. The CPU 21a waits until receiving the tampering check data.

When the CPU 21a receives the tampering check data from each of the ECUs 11 to 14, the determination in step S610 is YES. Thus, the CPU 21a compares a current value, referred to as D[n], of the currently received tampering check data with a previous value, referred to as D[n−1], of the tampering check data for each ECU. The previous value D[n−1] is received by the CPU 21a to be stored in the EEPROM 21b previous to the current value D[n] The CPU 21a checks whether the tampering check data stored in each of the EEPROMs 11b to 14b is tampered with.

Specifically, the CPU 21a determines that the tampering check data is tampered with when the relationship between the current value D[n] and the previous value D[n−1] is not matched with the predetermined change tendency of the tampering check data. For example, assuming that the tampering check data is the accumulated mileage transmitted from the mileage accumulated ECU 14, the change tendency of the accumulated mileage is on the increase. The CPU 21a, therefore, determines that the tampering check data (accumulated mileage) is tampered with when the current value [Dn]> the previous value D[n−1]. In contrast, when the change tendency of the tampering check data is on the decrease, the CPU 21a can determine that the tampering check data is tampered with when the current value [Dn]> the previous value D(n−1).

In step S630, the CPU 21a determines whether the checked result in step S620 represents that the tampering check data is tampered with. When the checked result in step S620 represents that the tampering check data is not tampered with (the determination in step S630 is YES), the CPU 21a shits to step S640.

In step S640, the CPU 21a stores the current value D[n] of the tampering check data in the EEPROM 21b as the previous value D[n−1], returning to step S610. The previous value D[n−1] stored in the EEPROM 21b in step S640 is used to check operation in step S620 when the tampering check data is next received by the CPU 21a as a new current value D[n].

When the checked result in step S620 represents that the tampering check data is tampered with (the determination in step S630 is NO), the CPU 21a shifts to step S650 to transmit a signal for informing tampering to the at least one of the ECUs 11 to 14, returning to step S610.

The at least one of the ECUs 11 to 14 that receives the transmitted signal for informing tampering executes the predetermined fail-safe operations.

As described above, in the communication system 1A of the second embodiment, even through the at least one data item of the computed data transmitted from each of the ECUs 11 to 14, which has been updated during the normal operations thereof, is tampered with, it is possible to surely detect that the at least one data item of the computed data is tampered with. With this, just like the first embodiment, even if, for example, the EEPROM 14b is illegally replaced with new one so that a total mileage displayed on the odometer by the meter ECU 13 is tampered with to be shorter than the true total mileage, it is possible to certainly detect such an occurrence of tampering.

In the operation in step S620 shown in FIG. 4B, the CPU 21a can store the current value D[n] of the tampering check data in the RAM as the previous value D[n−1] thereof. In this modification, in step S620, the CPU 21a can read out the previous value D[n−1] of the tampering check data from the RAM.

Third Embodiment

Next, a communication system according to a third embodiment will be described hereinafter. The communication system according to the third embodiment has substantially the same structure as the first embodiment so that the elements in the communication system of the third embodiment, which are the same as those in the first embodiment, are assigned to the same reference numerals of the elements shown in FIG. 1.

Figure 5A:
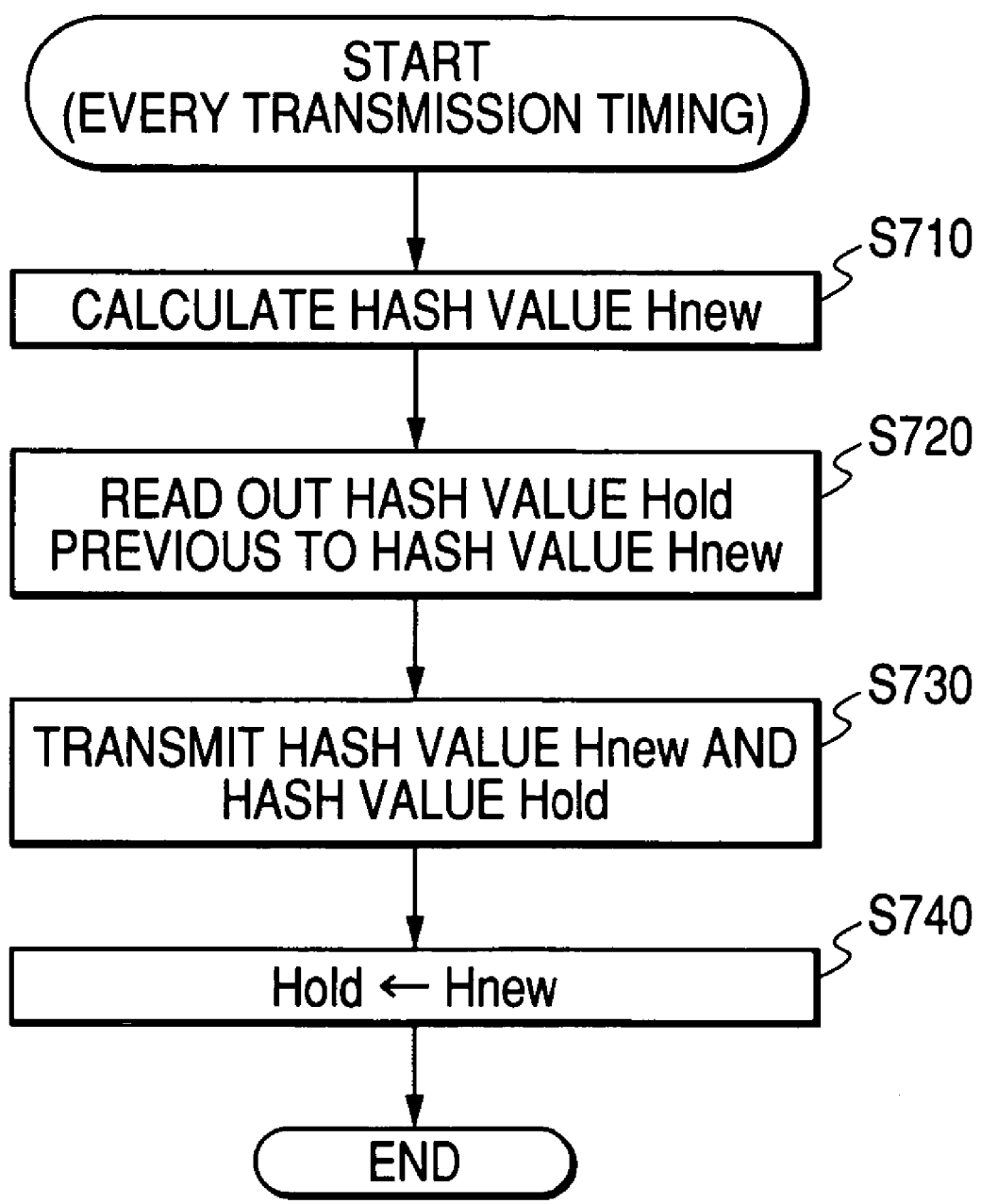
FIG. 5A is a flowchart schematically illustrating operations executed by each ECU in the control-oriented network according to a third embodiment of the invention.

In the communication system 1B of the third embodiment, as compared with the communication system 1, each of the CPUs 11a to 14a of each of the ECUs 11 to 14 executes operations shown in FIG. 5A in addition to the operations shown in FIGS. 2A and 3A. In addition, the CPU 21a of the gateway 21 executes operations shown in FIG. 5B in addition to the operations shown in FIGS. 2B and 3B. Each of the CPUs 11a to 14a and 21a executes each of the programs stored in each of the ROMs to carry out the operations shown in FIGS. 5A and 5B.

Specifically, during the turning-on of the ignition switch IS, every time a transmission timing is transmitted at regular intervals each of the CPUs 11a to 14a executes the operations shown in FIG. 5A.

In step S710, each of the CPUs 11a to 14a determines the hash function for each data file corresponding to the computed data, constant data, and the at least one program stored in each of the EEPROMs 11b to 14b. Each of the CPUs 11a to 14a passes each data file as an argument to the determined hash function to obtain a current hash value, referred to as "new hash value $H_{new}$", corresponding to each data file stored in each of the EEPROMs 11b to 14b. Incidentally, each of the CPUs 11a to 14a can obtain a current hash value corresponding to at least portion of each data file stored in each of the EEPROMs 11b to 14b. The current hash value includes feature information indicative of features of each data file stored in each of the EEPROM 11b to 14b.

In step S720, each of the CPUs 11a to 14a reads out a previous hash value, referred to as "old hash value $H_{old}$", which is obtained in the previous step S710 to be stored in each of the EEPROMs 11b to 14b previous to the new hash value $H_{new}$. In step S730, each of the CPUs 11a to 14a transmits the new hash value $H_{new}$ calculated by the operation in step S710 and the old hash value $H_{old}$ readout by the operation is step S720 to the gateway 21.

In step S740, each of the CPUs 11a to 14a stores the new hash value $H_{new}$ in each of the EEPROMs 11b to 14b as the old hash value $H_{old}$, terminating the operations. The old hash value $H_{old}$ stored in step S740 is used to readout operation in step S720 after a next hash value is calculated by the operation of each of the CPUs 11a to 14a in step S710.

On the other hand, the CPU 21a of the gateway 21 executes the operations shown in FIG. 5B during the turning-on of the ignition switch IS.

Specifically, in step S810, the CPU 21a of the gateway 21 determines whether the new hash value $H_{new}$ and the old hash value $H_{old}$ transmitted from at least one of the ECUs 11 to 14 are received by the CPU 21a. The CPU 21a waits until receiving the new hash value $H_{new}$ and the old hash value $H_{old}$ from at least one of the ECUs. 11 to 14.

When the CPU 21a receives the new hash value $H_{new}$ and the old hash value $H_{old}$ from at least one of the ECUs 11 to 14, the determination in step S810 is YES so that the CPU 21a shifts to step S820 to carry out tampering check operations for the at least one of the ECUs 11 to 14.

Specifically, in step S820, the CPU 21a compares the currently received old hash value, referred to as "$H_{old}$ [n]", with a new hash value, referred to as "$H_{new}$ [n−1]", transmitted from the at least one of the ECUs 11 to 14. The new hash value $H_{new}$ [n−1] is received by the CPU 21a to be stored in the EEPROM 21b previous to the reception of the old hash value $H_{old}$ [n].

The CPU 21a checks whether each data file stored in at least one of the EEPROMs 11b to 14b is tampered with based on the comparison result.

That is, when determining that the currently received old hash value $H_{old}$ [n] is inconsistent with the previously received new hash value $H_{new}$ [n−1], the CPU 21a determines that each data file stored in the at least one of the EEPROMs 11b to 14b is tampered with.

This is because, when the at least one of the EEPROMs 11b to 14b is normal without tampering, the currently received old hash value $H_{old}$ [n] and the previously received new hash value $H_{new}$ [n−1], which correspond to the at least one of the EEPROM 11b to 14b, are consistent with each other.

When determining that the currently received old hash value $H_{old}$ [n] is consistent with the previously received new hash value $H_{new}$ [n−1], the CPU 21a determines that each data file stored in the at least one of the EEPROMs 11b to 14b is not tampered with.

In step S830, the CPU 21a determines whether the checked result in step S820 represents that each data file stored in the at least one of the EEPROMs 11b to 14b is not tampered with. When the checked result in step S820 represents that each data file is not tampered (the determination in step S830 is YES), the CPU 21a shits to step S840.

In step S840, the CPU 21a stores the currently received hash value, referred to as "$H_{new}$ [n]", in the EEPROM 21b as the previously received new hash value $H_{new}$ [n−1], returning to step S810. The previously received hash value $H_{new}$ [n−1] stored in the EEPROM 21b in step S840 is used to check operation in step S820.

When the checked result in step S820 represents that each data file is tampered (the determination in step S830 is NO), the CPU 21a shits to step S850 to transmit a signal for informing tampering to each data file of the at least one of the ECUs 11 to 14, returning to step S810. The CPU 21a transmits the signal for informing tampering another ECU that receives information from the at least one of the ECUs 11 to 14.

The at least one of the ECUs 11 to 14 that receives the transmitted signal for informing tampering executes the predetermined fail-safe operations.

As described above, in the communication system 1B of the third embodiment, each of the ECUs 11 to 14 is configured to transmit to the gateway 21 the current hash values indicative of the current features of each data file stored in each of the EEPROM 11b to 14b and the previous hash values indicative of the previous features thereof. This configuration allows the gateway 21 to detect that each data file stored in each of the EEPROMs 11b to 14b is tampered during the normal operations of each of the ECUs 11 to 14 based on the transmitted hash values.

Specifically, even if a third party tampers with at least portion of the data files stored in at least one EEPROM or replaces at least one EEPROM with new one to falsify the computed data in at least one ECU, it is possible for the gateway 21 to determine that the data files are tampered based on the operation in step S820.

That is, the hash function is a type of one-way functions so that the inverse of the hash value is very difficult to calculate. Assuming that, therefore, each of the ECUs 11 to 14 merely transmits a hash value of the at least one data item to the gateway 21 in place of the at least one data item in step S510 in FIG. 5A, it would be difficult for the gateway 21 to determine whether the at least one data item is tampered.

The communication system 1B, however, because of transmitting the current hash values indicative of the current features of each data file stored in each of the EEPROM 11b to 14b and the previous hash values indicative of the previous features thereof, permits detection of whether the computed data is tampered during the normal operations of each ECU.

In step S710 of FIG. 5A, each of the CPUs 11a to 14a can calculate a current hash value corresponding to a particular item of the computed data stored in each of the EEPROMs 11b to 14b. In step S710 of FIG. 5A, other types of one-way functions can be used in place of the hash function.

Operations of a communication system according to a modification of the first to third embodiments will be described hereinafter in accordance with FIGS. 6A and 6B. The communication system in the modification targets for tampering detection the at least one program and constant data previously installed, as tampering detection data, in each of the ECUs 11 to 14.

Figure 6A:
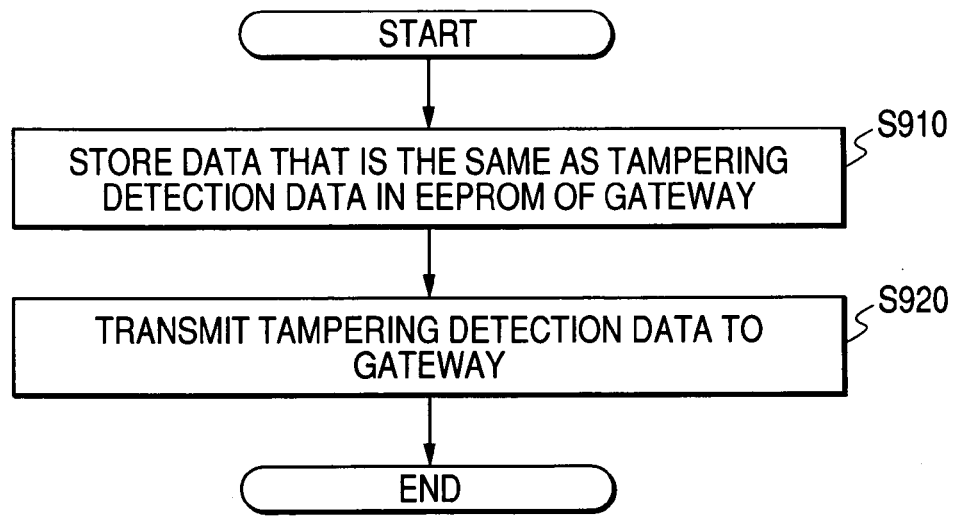
FIG. 6A is a flowchart schematically illustrating operations executed by each ECU in the control-oriented network according to a modification of each embodiment of the invention.
Figure 6B:
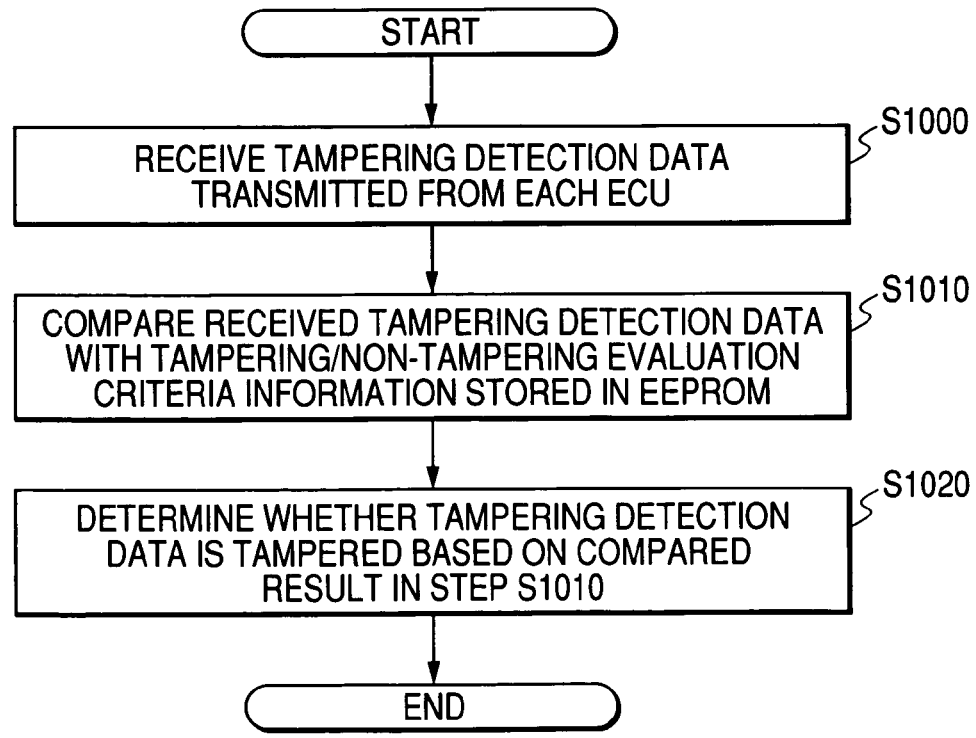
FIG. 6B is a flowchart schematically illustrating operations executed by the gateway according to the modification.
Figure 8:
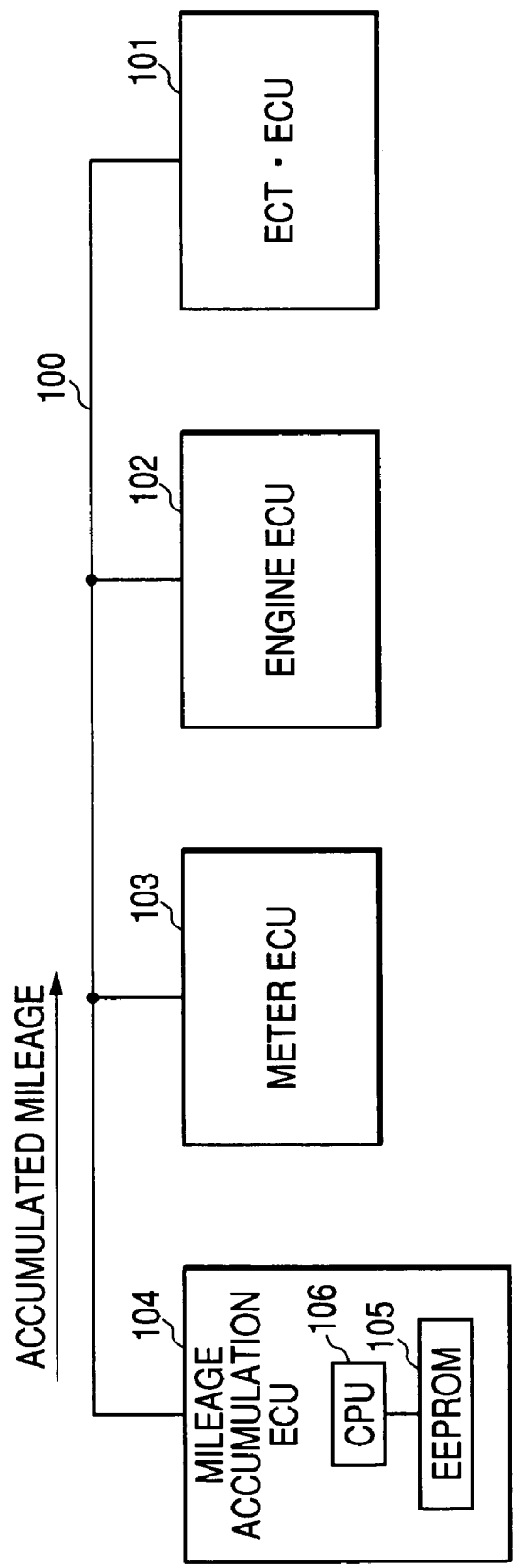
FIG. 8 is a block diagram illustrating a configuration of a conventional communication system.

At first, at an automobile dealer, a manufacturing factory, or the like, data that is the same as the tampering detection data previously installed in each of the ECUs 11 to 14 is previously stored in the EEPROM 21b of the gateway 21 as tampering non-tampering evaluation criteria information in step S910 of FIG. 6A. Incidentally, a function value indicative of the feature of the tampering detection data based on a one-way function, such as a hash function, can be stored in the EEPROM 21b of the gateway 21.

In step S920, each of the CPUs 11a to 14a of each of the ECUs 11 to 14 transmits the tampering detection data (or whose function value) integrated therein to the gateway 21 every predetermined timing, such as at regular intervals, or each time each of the ECUs 11 to 14 starts to operate.

In step S1000 of FIG. 613, when receiving the tampering detection data (or whose function value) transmitted from any one of the ECUs 11 to 14, the CPU 21a of the gateway 21 reads out the tampering/non-tampering evaluation criteria information corresponding to any one of the ECUs 11 to 14 from the EEPROM 21b. In step S1010, the CPU 21a compares the received tampering detection data with the readout tampering/non-tampering evaluation criteria information. In step S1020, the CPU 21a determines whether the tampering detection data is tampered based on the compared result in step S1010. When the compared result represents that the received tampering detection data is mismatched with the readout tampering/non-tampering evaluation criteria information, the CPU 21a determines that the tampering detection data is tampered.

As set forth above, when targeting for tampering detection the at least one program and constant data previously installed, as tampering detection data, in each of the ECUs 11 to 14, it is unnecessary to update the tampering/non-tampering evaluation criteria information stored in the gateway 21. In addition, only to determine whether the received tampering detection data is content with the tampering/non-tampering evaluation criteria information in the gateway 21 allows determination of whether the tampering detection data is tampered with.

Incidentally, in the modification, the operation of each of the ECUs 11 to 14 in step S920 represents, for example, a first transmitting module of the present invention, and the operation of the gateway 21 in step S1000 represents, for example, a receiving module of the present invention. In the modification, the operation of the gateway 21 in step S1000 represents, for example, a comparing module of the present invention.

In each of the first to third embodiment and their modifications, a tamper resistant module 21b1 can be used as the EEPROM 21b of the gateway 21. The tamper resistant module 21b1 provides several means of protecting stored data, as well as securing certain operations from being interrupted or corrupted. There several levels of tamper resistance ranges from simple software scrambling to a fully hardware-shielded microcontroller including several sensors and filters. The latter is used, for example, in Smart Cards, which provides the highest level of security against all known attack scenarios such as probing, differential power analysis, brute force, and others.

Specifically, the tamper resistant module 21b1 can prevent a third party from tampering with the tampering/non-tampering evaluation criteria information stored in the gateway 21, making it possible to improve the protection capability of data stored in the communication systems related to the invention.

As communications between each of the ECUs 11 to 14 and the gateway 21 through the communication line L1, an encrypted communication that communicates encrypted data therebetween can be applied.

In each of the first to third embodiments and their modifications, whether data stored in each of the ECUs 11 to 14 in the control-oriented network N1 is tampered is detected, but whether data stored in each of the ECUs 15 and 16 in the multimedia-oriented network N2 is tampered can be detected in similar manners with respect to each of the ECUs 11 to 14.

In each of the first to third embodiments and their modifications, the gateway 21 serves as a master unit for detecting tampering, but if a communication system has no gateway, at least one of the ECUs that communicably coupled to each of the ECUs can serve a master unit for detecting tampering. It is preferable that the gateway 21 serves as the master unit for detecting tampering because it can collect data stored in each of ECUs installed in a vehicle.

In each of the first to third embodiments and modifications, one-way functions used to calculate the feature information indicative of the features of the data files stored in each of the EEPROM 11b to 14b can be changed for each file.

Other types of one-way functions can be used in place of the hash function to calculate the feature information indicative of the features of the data files stored in each of the EEPROM 11b to 14b.

In each of the first to third embodiments and modifications, the operations executed by the CPUs are implemented in the corresponding electronic units (ECUs and gateway) as software, but the present invention is not limited to the structure. For example, the operations executed by the CPUs can be implemented by hardwired logic circuits, which serve as electronic units.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A communication system with first and second electronic units communicably coupled to each other, the first electronic unit storing data, the communication system comprising:
   a transmitting module provided in the first electronic unit and configured to transmit to the second electronic unit first information indicative of a feature of the data stored in the first electronic unit in response to when the first electronic unit detects its shutdown state;
   a storing module provided in the second electronic unit and configured to receive the first information transmitted from the transmitting module and to store the received first information as second information;
   a first transmitting module provided in the first electronic unit and configured to transmit to the second electronic unit the first information in response to when the first electronic unit starts to operate;
   a receiving module provided in the second electronic unit and configured to receive the first information transmitted from the first transmitting module; and
   a comparing module provided in the second electronic unit and configured to compare the received first information with the second information to determine whether the data stored in the first electronic unit is tampered based on the compared result.

2. A communication system according to claim 1, wherein the first information is the data itself stored in the first electronic unit.

3. A communication system according to claim 1, wherein the first information is a function value obtained by passing the data as an argument to a predetermined function.

4. A communication system according to claim 1 wherein the storing module is provided with a storage medium and is configured to previously store the second information in the storage medium, the storage medium being designed to a tamper resistant module.

5. A communication system according to claim 1, wherein the data includes at least one of computed data that varies during operations of the first electronic unit, a program, and constant data.

6. A communication system according to claim 1, further comprising:
   a first termination module provided in the first electronic unit and configured to execute a termination processing in response to when the first electronic unit detects its shutdown state after that the second transmitting module transmits to the second electronic unit the first information; and
   a second termination module provided in the second electronic unit and configured to execute a termination processing in response to when the second electronic unit detects its shutdown state after that the storing module receives the first information transmitted from the second transmitting module to store the received first information as the second information.

7. A communication system with first and second electronic units communicably coupled to each other, the first electronic unit storing data, the communication system comprising:
   a first transmitting module provided in the first electronic unit and configured to transmit to the second electronic unit first information indicative of a feature of the data stored in the first electronic unit;
   a storing module provided in the second electronic unit and configured to previously store second information corresponding to the first information;
   a receiving module provided in the second electronic unit and configured to receive the first information transmitted from the first electronic unit; and
   a comparing module provided in the second electronic unit and configured to compare the received first information with the second information to determine whether the data stored in the first electronic unit is tampered based on the compared result, wherein the data stored in the first electronic unit has been updated with a predetermined change tendency during operations of the first electronic unit, the first transmitting module is configured to transmit to the second electronic unit the data itself as the first information every predetermined timing, the receiving module is configured to receive the data transmitted from the first electronic unit every predetermined timing, and the comparing module is configured to compare a relationship between a current value of the data and a previous value thereof with the predetermined change tendency, and to determine that the data stored in the first electronic unit is tampered when the relationship is mismatched with the predetermined change tendency, the current value of the data being currently received by the receiving unit, the previous value of the data being received by the receiving unit previous to the current value.

8. A communication system with first and second electronic units communicably coupled to each other, the first electronic unit storing data, the communication system comprising:
   a first transmitting module provided in the first electronic unit and configured to transmit to the second electronic unit first information indicative of a feature of the data stored in the first electronic unit;
   a storing module provided in the second electronic unit and configured to previously store second information corresponding to the first information;
   a receiving module provided in the second electronic unit and configured to receive the first information transmitted from the first electronic unit; and
   a comparing module provided in the second electronic unit and configured to compare the received first information with the second information to determine whether the data stored in the first electronic unit is tampered based on the compared result, wherein the first information is a function value obtained by passing the data as an argument to a one-way function.

9. A communication system with first and second electronic units communicably coupled to each other, the first electronic unit storing data, the communication system comprising:
   a first transmitting module provided in the first electronic unit and configured to transmit to the second electronic unit first information indicative of a feature of the data stored in the first electronic unit;
   a storing module provided in the second electronic unit and configured to previously store second information corresponding to the first information;
   a receiving module provided in the second electronic unit and configured to receive the first information transmitted from the first electronic unit; and
   a comparing module provided in the second electronic unit and configured to compare the received first information with the second information to determine whether the data stored in the first electronic unit is tampered based on the compared result,
   wherein the first transmitting module is configured to:
      pass the data as an argument to a one-way function every predetermined timing to calculate a first function;
      store therein the first function calculated every predetermined timing; and
      transmit to the second electronic unit a new function value of the first function calculated every predetermined timing and an old function value thereof stored therein at each predetermined timing,
   wherein the receiving module is configured to receive the new and old function values transmitted from the first electronic unit every predetermined timing,
   wherein the storing module is configured to store the received new function value as the second information,
   wherein the comparing module is configured to:
      compare the old function value currently received by the receiving module with the new function value previously received by the receiving module to be stored by the storing module as the second information; and
      determine that the data stored in the first electronic unit is tampered when the old function value currently received by the receiving module is inconsistent with the new function value previously received by the receiving module to be stored by the storing module.

10. A communication system installed in a vehicle and having first and second electronic control units communicably coupled to each other for controlling devices installed in the vehicle, the first electronic control unit storing data, the communication system comprising:

a transmitting module provided in the first electronic control unit and configured to transmit to the second electronic control unit first information indicative of a feature of the data stored in the first electronic unit in response to when the first electronic control unit detects its shutdown state;

a storing module provided in the second electronic control unit and configured to receive the first information and to store the received first information as second information:

a first transmitting module provided in the first electronic control unit and configured to transmit to the second electronic control unit the first information in response to when the first electronic control unit starts to operate;

a receiving module provided in the second electronic control unit and configured to receive the first information transmitted from the first transmitting module; and a comparing module provided in the second electronic control unit and configured to compare the received first information with the second information to determine whether the data stored in the first electronic control unit is tampered based on the compared result.

11. A communication system according to claim 10, wherein the vehicle has an ignition switch and a battery, and the ignition switch is connected to the battery and the first and second electronic control units, respectively, so that power is fed from the battery to each of the first and second electronic control units through the ignition switch, and the transmitting module transmits to the second electronic control unit the first information in response to when the first electronic control unit detects a turning off of the ignition switch corresponding to its shutdown state.

* * * * *